United States Patent
Nakajima

(10) Patent No.: US 9,937,874 B2
(45) Date of Patent: *Apr. 10, 2018

(54) VEHICULAR DISPLAY APPARATUS

(71) Applicant: YAZAKI CORPORATION, Tokyo (JP)

(72) Inventor: Harutoshi Nakajima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/297,631

(22) Filed: Oct. 19, 2016

(65) Prior Publication Data

US 2017/0106806 A1 Apr. 20, 2017

(30) Foreign Application Priority Data

Oct. 20, 2015 (JP) ................. 2015-206131

(51) Int. Cl.
| | |
|---|---|
| *B60R 11/02* | (2006.01) |
| *B60K 37/04* | (2006.01) |
| *F21V 7/00* | (2006.01) |
| *F21V 7/05* | (2006.01) |

(52) U.S. Cl.
CPC .......... *B60R 11/0235* (2013.01); *B60K 37/04* (2013.01); *F21V 7/0008* (2013.01); *F21V 7/05* (2013.01); *B60K 2350/2052* (2013.01); *B60K 2350/2056* (2013.01)

(58) Field of Classification Search
CPC .......... F21V 7/05; F21V 7/0008; B60Q 3/10; G01D 11/20

USPC .............. 362/296.09, 489, 516, 23.01–23.22
See application file for complete search history.

(56) References Cited

U.S. PATENT DOCUMENTS

| | | | |
|---|---|---|---|
| 7,755,601 B2 | 7/2010 | Yokota et al. | |
| 2006/0092098 A1 | 5/2006 | Yokota et al. | |
| 2008/0123322 A1* | 5/2008 | Tane ...................... | B60K 35/00 362/23.01 |

(Continued)

FOREIGN PATENT DOCUMENTS

| | | |
|---|---|---|
| JP | 2006-132951 A | 5/2006 |
| JP | 2009-192434 A | 8/2009 |

(Continued)

OTHER PUBLICATIONS

Japanese Office Action for the related Japanese Patent Application No. 2015-206131 dated Nov. 7, 2017.

*Primary Examiner* — Laura Tso
(74) *Attorney, Agent, or Firm* — Kenealy Vaidya LLP

(57) ABSTRACT

A vehicular display apparatus is provided on a vehicular instrument panel and provides a display for a vehicular crew. The apparatus includes: a half mirror that transmits light from a front of a vehicle to a back of the vehicle and reflects light from a direction intersecting with a front-back direction of the vehicle to the back of the vehicle, a decorative member provided to one side of a side of the front of the vehicle and a side of the intersecting direction, a light emitting member that irradiates the decorative member with light, and a liquid crystal display that is provided to the other side and projects an image toward the half mirror. The decorative member is arranged so as to provide a display superposed on the image projected by the liquid crystal display when visually recognized from a front side.

3 Claims, 6 Drawing Sheets

(56) References Cited

U.S. PATENT DOCUMENTS

| | | | | |
|---|---|---|---|---|
| 2010/0039796 A1* | 2/2010 | Mukawa | ............... | G02B 5/18 |
| | | | | 362/97.1 |
| 2014/0036472 A1* | 2/2014 | Ishihara | ............... | F21V 33/00 |
| | | | | 362/23.14 |
| 2015/0015457 A1* | 1/2015 | Takasu | ............... | G02B 27/01 |
| | | | | 345/7 |
| 2016/0016472 A1* | 1/2016 | Konishi | ............... | B60K 35/00 |
| | | | | 345/633 |

FOREIGN PATENT DOCUMENTS

| | | | |
|---|---|---|---|
| JP | 2010078322 | * | 4/2010 |
| JP | 2014-228391 A | | 12/2014 |
| JP | 2014228391 | * | 12/2014 |
| JP | 2015132583 | * | 7/2015 |

* cited by examiner

VEHICULAR DISPLAY APPARATUS

CROSS REFERENCE TO RELATED APPLICATION

This application is based on Japanese Patent Application (No. 2015-206131) filed on Oct. 20, 2015, the contents of which are incorporated herein by reference. Also, all the references cited herein are incorporated as a whole.

BACKGROUND OF THE INVENTION

1. Technical Field

The present invention relates to a vehicular display apparatus which is formed on a vehicular instrument panel and also provides a display for a vehicular crew.

2. Background Art

Conventionally, a vehicular display apparatus including a decorative member on the front of a liquid crystal display is proposed (for example, see Patent Reference 1). In this vehicular display apparatus, the decorative member is an actual three-dimensional body, with the result that vehicular display with good appearance can be provided by displaying an image by the liquid crystal display while representing a third dimension difficult to be represented in the liquid crystal display by the three-dimensional body.

Patent Reference 1 is JP-A-2006-132951.

SUMMARY OF THE INVENTION

However, in the vehicular display apparatus described in Patent Reference 1, an image from the liquid crystal display of the back cannot be projected in an arrangement area of the decorative member. Hence, it is contemplated to use an acrylic member having transparency as the decorative member.

However, in this case, because of a refractive index etc. of the acrylic member, appearance may be decreased by displaying a display image of the liquid crystal display in a distorted or blurred state by the acrylic member.

As a result, it is also contemplated to represent the decorative member by an image by the liquid crystal display, but the liquid crystal display displays a plane image, with the result that a third dimension or a texture of the decorative member cannot be reproduced and eventually, the appearance is decreased.

The invention solves such a problem, and an object of the invention is to provide a vehicular display apparatus capable of also displaying an image in an arrangement area of a decorative member and preventing a decrease in appearance.

A vehicular display apparatus according to the invention is the vehicular display apparatus which is provided on a vehicular instrument panel and also provides a display for a vehicular crew, the apparatus including a half mirror that transmits light from a front of a vehicle to a back of the vehicle and reflects light from a direction intersecting with a front-back direction of the vehicle to the back of the vehicle, a decorative member provided to one side of a side of the front of the vehicle and a side of the intersecting direction, a light emitting member that irradiates the decorative member with light, and a liquid crystal display that is provided to the other side of the side of the front of the vehicle and the side of the intersecting direction and projects an image toward the half mirror, wherein the decorative member is arranged so as to provide a display superposed on the image projected by the liquid crystal display when visually recognized from a front side of the decorative member.

Also, in the vehicular display apparatus according to the invention, preferably, the decorative member is an acrylic member having transparency.

Also, in the vehicular display apparatus according to the invention, preferably, the decorative member is an annular ring member, and the annular ring member is arranged so as to provide a display superposed on an image of a scale projected by the liquid crystal display when visually recognized from the front side of the annular ring member.

The vehicular display apparatus of the invention can also display the image in an arrangement area of the decorative member and prevent a decrease in appearance.

BRIEF DESCRIPTION OF THE DRAWINGS

FIG. 3A shows a perspective view and FIG. 3B shows a sectional view taken on line Y-Y of FIG. 3A.

DETAILED DESCRIPTION OF THE EXEMPLARY EMBODIMENTS

The invention will hereinafter be described along one preferred embodiment, but the invention is not limited to the following embodiment, and changes may be made without departing from the gist of the invention.

Figure 1:
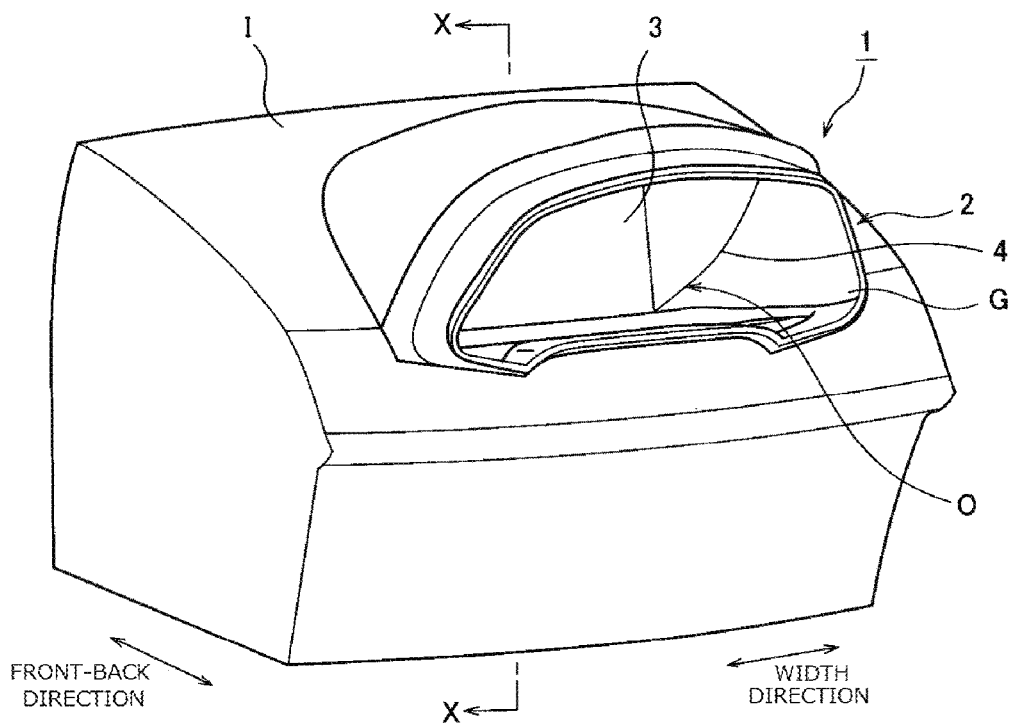
FIG. 1 is a perspective view showing a vehicular display apparatus according to an embodiment of the invention.
Figure 2:
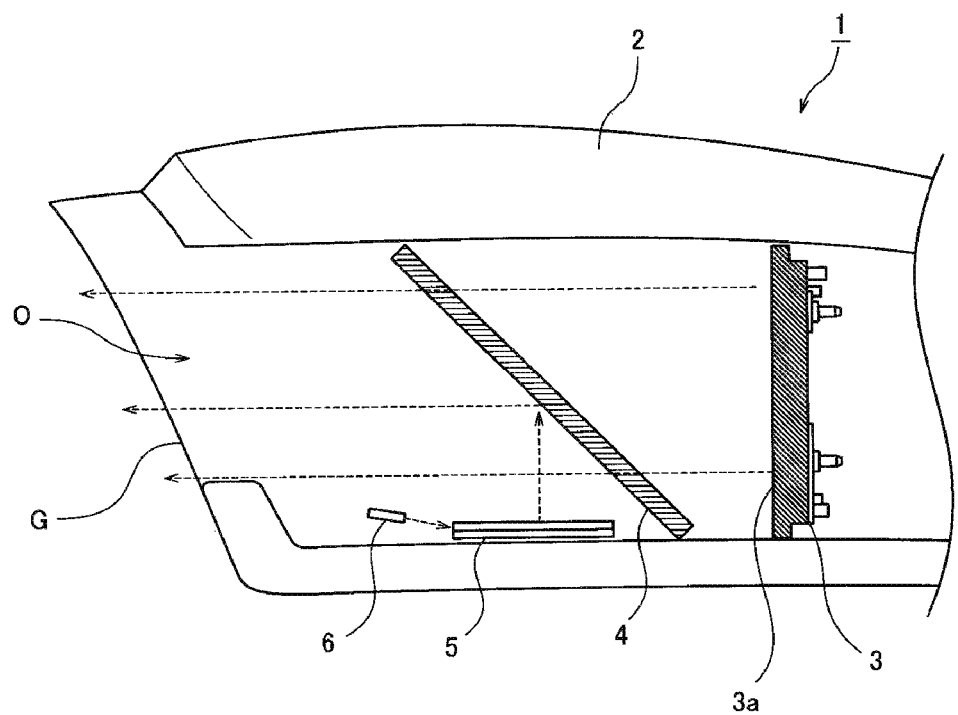
FIG. 2 is a sectional view taken on line X-X shown in FIG. 1.

FIG. 1 is a perspective view showing a vehicular display apparatus according to an embodiment of the invention, and FIG. 2 is a sectional view taken on line X-X shown in FIG. 1. A vehicular display apparatus 1 shown in FIGS. 1 and 2 has a case 2 formed integrally to a vehicular instrument panel I, and displays an image toward a vehicular crew through an opening O of the case 2. In addition, the side (that is, the back side of a vehicle) of the vehicular crew in the opening O of the case 2 is provided with a front glass plate G.

Such a vehicular display apparatus 1 includes a liquid crystal display 3, a half mirror 4, a decorative member 5, and a light emitting member 6 inside the case 2.

The liquid crystal display 3 is the so-called TFT-LCD (Thin Film Transistor Liquid Crystal Display: one example of the liquid crystal display), and is constructed so that a display surface 3a faces to the back of the vehicle and an image is projected toward the back of the vehicle.

The half mirror 4 is formed between the liquid crystal display 3 and the vehicular crew, that is, in the back side of the liquid crystal display 3 inside the case 2, and is a plate-shaped member having transmission and reflection functions. This half mirror 4 is installed in a state inclined to a front-back direction of the vehicle. That is, the half mirror 4 is arranged with a surface of the half mirror 4 set slightly downwardly so that the lower side of the half mirror 4 is nearer to the front of the vehicle. Such a half mirror 4 is constructed so that light from the front of the vehicle is transmitted to the back of the vehicle and also light from a direction (downward direction in the present embodiment) intersecting with the front-back direction of the vehicle is reflected to the back of the vehicle.

The decorative member 5 is either an acrylic member having transparency or a colored member which is a colored opaque member. Here, the acrylic member is a polymer of methacrylic acid ester or acrylic acid ester, and is a member constructed of an amorphous synthetic resin (so-called acrylic resin) with high transparency. In addition, the acrylic member may contain impurities etc. within the range capable of maintaining its transparency. Such a decorative member 5 is formed under the half mirror 4 arranged in the side of the intersecting direction, that is, in the inclined state. The light emitting member 6 is, for example, an LED (Light Emitting Diode) element, and is a member for irradiating the decorative member 5 with light. When the light emitting member 6 irradiates the decorative member 5 with light, the light from the light emitting member 6 is reflected on the decorative member 5. This reflected light is further reflected toward the back of the vehicle by the half mirror 4, and reaches the side of the vehicular crew through the front glass plate G. That is, the vehicular crew recognizes the decorative member 5. At this time, the vehicular crew recognizes as if the decorative member 5 were present in the back side of the half mirror 4, that is, the installation side of the liquid crystal display 3, and a virtual image is displayed.

Figure 3A:
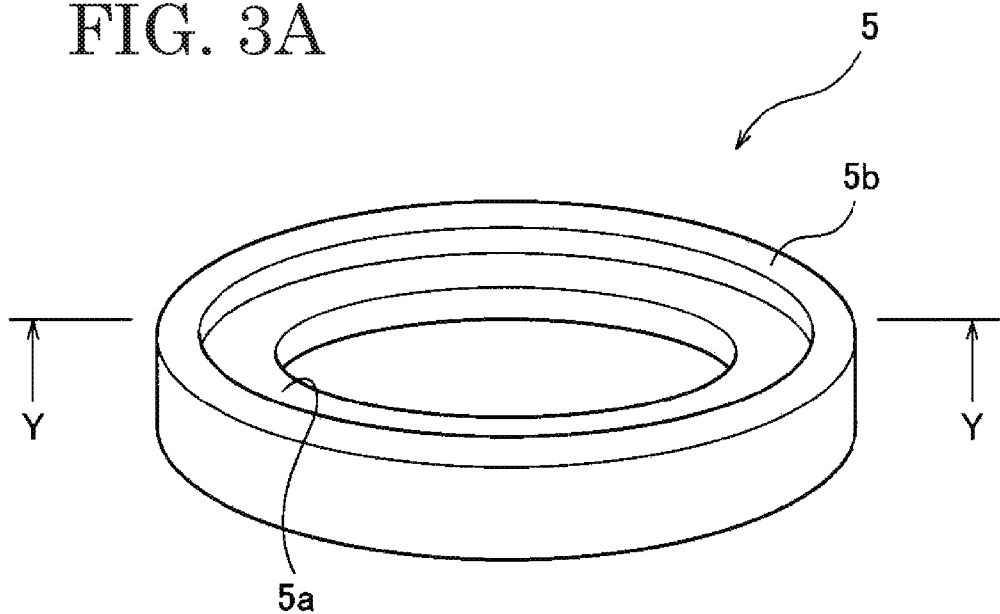
FIGS. 3A and 3B are detail views showing a decorative member shown in FIG. 2.
Figure 3B:
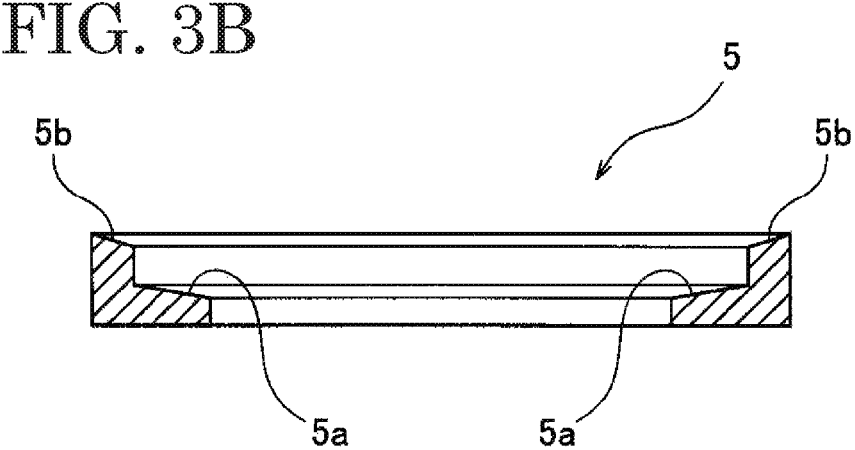

FIGS. 3A and 3B are detail views showing the decorative member 5 shown in FIG. 2, and FIG. 3A shows a perspective view, and FIG. 3B shows a sectional view taken on line Y-Y of FIG. 3A. For convenience of description, FIG. 3A illustrates also the light emitting member 6.

As shown in FIGS. 3A and 3B, the decorative member 5 is, for example, an annular ring member and as shown in FIG. 3B, a cross-sectional portion of the member is formed in a two-step shape. Step surfaces 5a, 5b (upper surfaces in FIG. 3B) are inclined toward the center of an annular shape (so that the center side becomes thinner than the outside in thickness).

Figure 4:
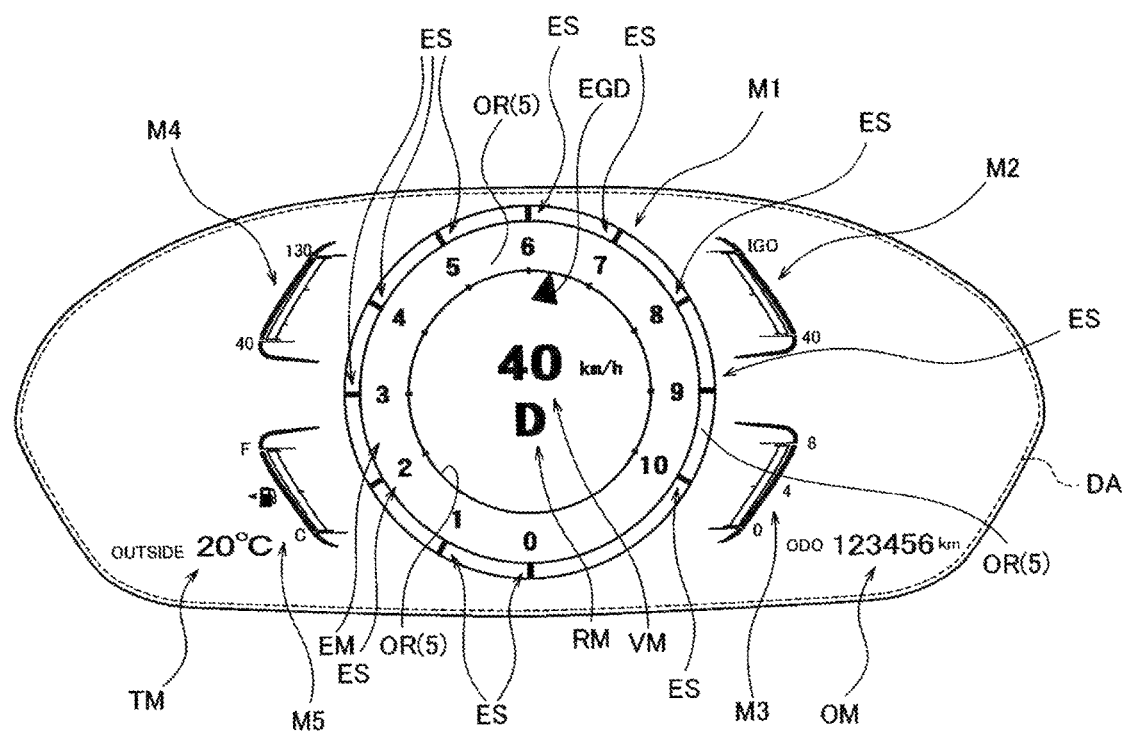
FIG. 4 is a front view showing one example of a display form by the vehicular display apparatus according to the present embodiment.

Next, a display example by the vehicular display apparatus 1 according to the present embodiment will be described. FIG. 4 is a front view showing one example of a display form by the vehicular display apparatus 1 according to the present embodiment. As shown in FIG. 4, the vehicular display apparatus 1 displays a main instrument M1, our auxiliary instruments M2 to M6, an outside air temperature indicator TM and an odometer OM.

The main instrument M1 is an annular instrument integrally having a speedometer VM, an engine tachometer EM and a shift lever indicator RM. Such a main instrument M1 includes an O ring OR represented by a virtual image display of the annular decorative member 5 as one component.

The speedometer VM displays a vehicle speed in a position of the center of the O ring OR by a numerical value, and in the example shown in FIG. 4, the vehicle speed is displayed by, for example, "40 km/h".

The engine tachometer EM includes an engine revolution scale ES with an arcuate shape (an arcuate shape excluding the right lower side) displayed on the O ring OR, and a pointing indicator EGD with, for example, a triangle indicating the number of revolutions of the present engine.

The shift lever indicator RM displays a shift position in a position of the center of the O ring OR by an alphabet and a numerical value, and in the example shown in FIG. 4, the shift position is displayed by, for example, "D" (a drive position).

The auxiliary instruments M2 to M6 are instruments displayed in each of the two upper and lower steps on the right and left of the main instrument M1. The vehicular display apparatus 1 displays instruments such as a fuel gauge, a water temperature gauge and an air pressure gauge as the auxiliary instruments M2 to M6. In addition, the auxiliary instruments M2 to M6 are not limited to the above instruments, and may be instruments indicating, for example, a throttle position, an engine load factor, an eco extent, and regenerative power.

The outside air temperature indicator TM indicates an air temperature of the outside of the vehicle, and is displayed on the left lower side of the main instrument M1. The odometer OM indicates an integrated running distance of the vehicle, and is displayed on the right lower side of the main instrument M1.

Here, as is clear from FIG. 1, the decorative member 5 is arranged so as to provide a display (virtual image display of the O ring OR in FIG. 4) superposed on an image of the engine revolution scale ES projected by the liquid crystal display 3 in the case where a user visually recognizes the apparatus 1 from the front side (that is, the user visually recognizes the apparatus 1 from the driver's seat). That is, the image of the engine revolution scale ES projected by the liquid crystal display 3 is displayed with the image superposed on the O ring OR displayed as the virtual image. In addition, in the above, the image of the engine revolution scale ES is superposed and displayed, but the superposed image is not limited to the image of the engine revolution scale ES.

Here, the case where the user visually recognizes the apparatus 1 from the front side is a state in which the user sits on the driver's seat and visually recognizes the apparatus 1, and more specifically, is a state visually recognized from the inside of an eye lips range in JIS standards. As a result, for example, the image of the engine revolution scale ES is displayed with the image superposed on the O ring OR displayed as the virtual image even in the case of being visually recognized from any position within the eyelips range. Also, the image may be displayed with the image superposed on the O ring OR only at the time of being visually recognized from a particular position within the eyelips range.

Next, operation of the vehicular display apparatus 1 according to the present embodiment will be described. First, in the vehicular display apparatus 1, the light emitting member 6 irradiates the decorative member 5 with light and thereby, the light is reflected by the half mirror 4, and the decorative member 5 is visually recognized. That is, the decorative member 5 is displayed as the virtual image. In this decorative member 5, a three-dimensional body is displayed as the virtual image, with the result that the vehicular crew visually recognizes the presence of the decorative member 5 without losing good appearance by the actual three-dimensional body.

Also, the liquid crystal display 3 displays an image. Here, the liquid crystal display 3 projects the image of the engine revolution scale ES so that the vehicular crew visually recognizes the decorative member 5 superposed on the image of the engine revolution scale ES. Accordingly, the image of the engine revolution scale ES is displayed with the image superposed on the O ring OR which is the virtual image display of the decorative member 5, and even when the decorative member 5 is the acrylic member, the vehicular crew visually recognizes the image of the engine revolution scale ES as the image having good appearance without refracting or blurring the image.

Thus, according to the vehicular display apparatus 1 according to the present embodiment, reflection by the half mirror 4 visually recognizes the decorative member 5, and a high-grade feeling can be produced using the actual decorative member 5. Moreover, since the decorative member 5 is arranged so as to provide the virtual image display superposed on the image from the liquid crystal display 3, the image from the liquid crystal display 3 is visually recognized with the image superposed on the decorative member 5, and the image can also be displayed in an arrangement area of the decorative member 5. Further, even when the decorative member 5 is the acrylic member, the image is not refracted or blurred and further, it is unnecessary to represent the decorative member 5 by the image. Consequently, the image can also be displayed in the arrangement area of the decorative member 5, and a decrease in appearance can be prevented.

Also, when the decorative member 5 is the acrylic member having transparency, the image can be displayed with the image superposed on the acrylic member capable of producing a high-grade feeling by, for example, a deep feeling or light reflection by outside light, and the vehicular display apparatus 1 with better appearance can be provided.

Also, the decorative member 5 is the annular ring member, and the annular ring member is arranged so as to provide the virtual image display superposed on the image of the engine revolution scale ES projected by the liquid crystal display 3 in the case of being visually recognized from the front side by the user, with the result that the decorative member 5 can be formed in a scale ring of the instrument such as the engine tachometer EM frequently visually recognized by the vehicular crew, and good appearance can be achieved by the instrument frequently visually recognized while showing an eye-catching capability by the three-dimensional body. That is, since the decorative member 5 is not visually recognized too often when the decorative member 5 is arranged in a region which is not visually recognized too often, the vehicular crew has low frequency at which good appearance is felt, and the good appearance cannot be achieved effectively. However, by using the decorative member 5 in a region frequently visually recognized, the frequency at which the good appearance is felt can be increased to effectively achieve the good appearance.

The invention has been described above based on the embodiment, but the invention is not limited to the embodiment described above, and changes may be made without departing from the gist of the invention, or a technique of each embodiment may be combined in the possible scope.

The light emitting member 6 is configured to directly irradiate the decorative member 5 with light, but is not limited to this configuration, and indirect irradiation in which light from the light emitting member 6 is guided to the decorative member 5 through a light guide plate etc. may be used.

Further, in the present embodiment, the decorative member 5 is the annular ring member, but is not particularly limited to the annular shape, and may be formed in, for example, a linear shape. Also, the decorative member 5 may be applied as a part of the auxiliary instruments M2 to M6. Further, the decorative member 5 is not limited to a part of the instruments, and may be used as a member for mere decoration.

Moreover, the vehicular display apparatus 1 according to the present embodiment is configured to display the decorative member 5 as the virtual image, but is not limited to this configuration, and may be constructed so that the decorative member 5 is formed to the side of the front of the vehicle of the half mirror 4 and also the liquid crystal display 3 is formed to the side (lower side of the half mirror 4) of the intersecting direction and an image from the liquid crystal display 3 is displayed as the virtual image. In this case, the decorative member 5 is arranged so as to provide a half mirror transmission display (physical display) superposed on the image from the liquid crystal display 3 in the case of being visually recognized from the front side by a user. In addition, since the size of the decorative member 5 is smaller than that of the liquid crystal display 3, the case where the decorative member 5 is displayed as the virtual image can utilize installation space more effectively than the case where the decorative member 5 is not displayed as the virtual image, with the result that the case where the decorative member 5 is displayed as the virtual image is preferable.

Further, in the embodiment described above, the decorative member 5 is the annular ring member, and the liquid crystal display 3 projects the image of the engine revolution scale ES superposed on a position on the half mirror 4 in which the vehicular crew visually recognizes the ring member, but the image is not limited to the image of the engine revolution scale ES, and the projected image may be an image of a speed scale or other images.

Figure 5:
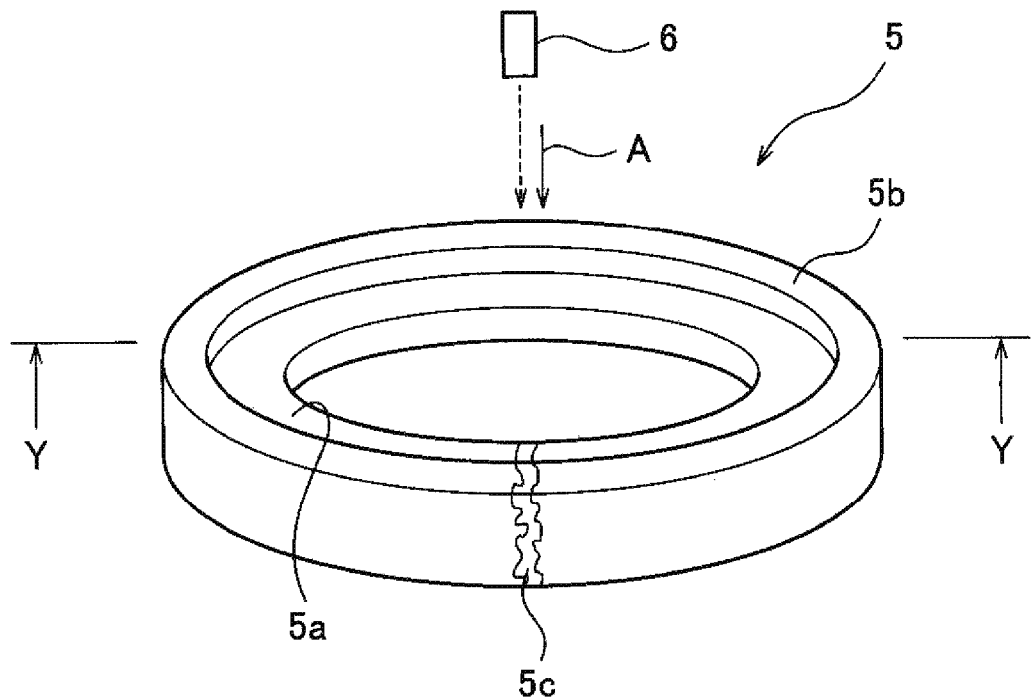
FIG. 5 is a perspective view showing a modified example of the decorative member shown in FIG. 2.

Also, when the decorative member 5 has an uneven portion described below in the present embodiment, the decorative member 5 is preferably arranged as described below. FIG. 5 is a perspective view showing a modified example of the decorative member 5 shown in FIG. 2. As shown in FIG. 5, an annular decorative member 5 may have an uneven portion (weld line) 5c. More specifically, when the annular decorative member 5 is manufactured, a resin is run into a mold. In this case, for example, when the inside of the mold is filled with the resin from a direction of arrow A shown in FIG. 5, the uneven portion 5c tends to occur in the side opposed to the direction of arrow A.

Figure 6:
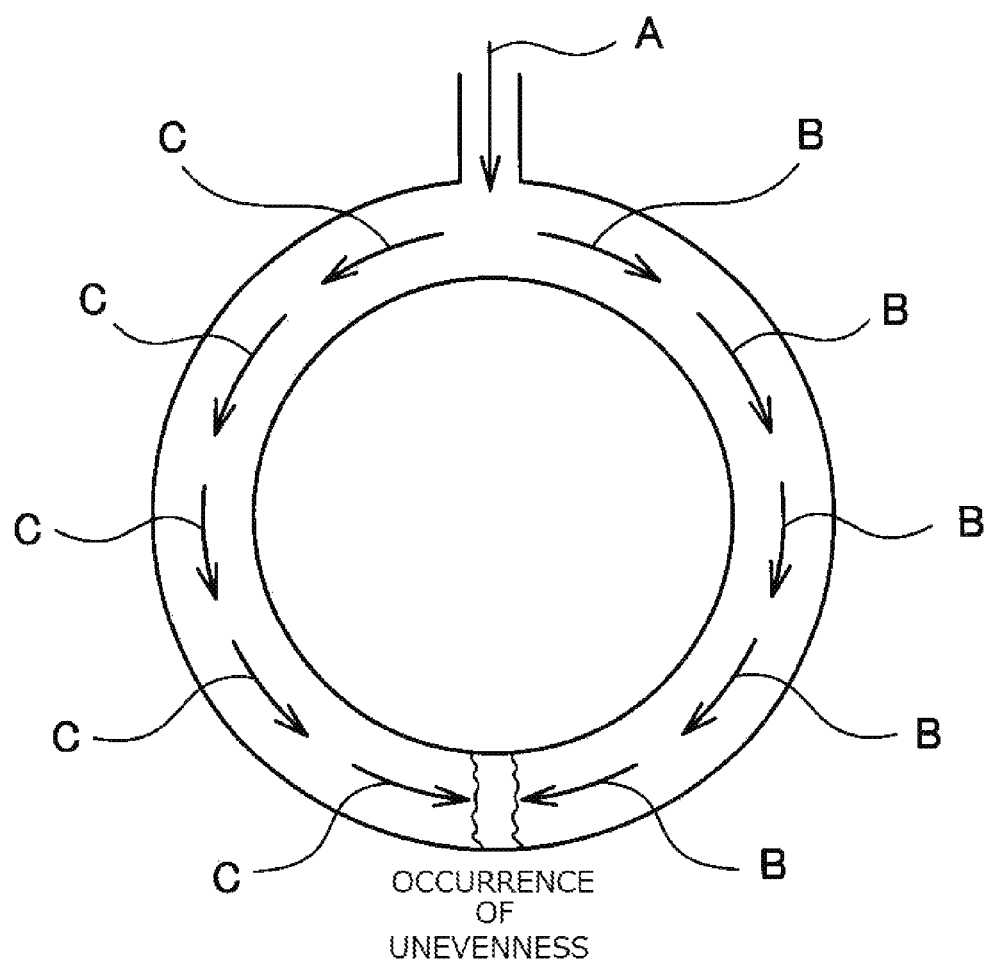
FIG. 6 is a schematic diagram showing a situation in the case of manufacturing an annular decorative member.

FIG. 6 is a schematic diagram showing a situation in the case of manufacturing an annular decorative member 5. As shown in FIG. 6, when a mold is filled with a resin from a particular direction (direction of arrow A) of the mold, the resin is respectively branched to a clockwise side (numeral B) and a counterclockwise side (numeral C) inside the mold and proceeds to the inside of the mold, and the mutual resins are joined in a region opposite to the side of the particular direction. Such a joined portion of the resin results in the uneven portion 5c.

As a result, the vehicular display apparatus 1 including the decorative member 5 according to the modified example is constructed so that the annular decorative member 5 is installed with the uneven portion 5c facing to the side opposite to the installation side of the light emitting member 6 and the uneven portion 5c is not directly irradiated with light as shown in FIG. 5. This is because the uneven portion 5c can be prevented from being conspicuous by irradiation with the light.

What is claimed is:

1. A vehicular display apparatus which is provided on a vehicular instrument panel and also provides a display for a vehicular crew, the apparatus comprising:
   a half mirror that transmits light from a front of a vehicle to a back of the vehicle and reflects light to the back of the vehicle, which reflected light is incident on a back side of the half mirror from a direction intersecting with a front-back direction of the vehicle, a decorative member that is adjacent to the back side of the half mirror, a light emitting member that irradiates the decorative member with light, and a liquid crystal display that is adjacent to a front side of the half mirror that is a side of the half mirror that is opposite to the back side of the half mirror in the front-back direction of the vehicle, and projects an image toward the front side of the half mirror, wherein the decorative member is arranged so as to provide a display superposed on the image projected by the liquid crystal display when visually recognized from a front side of the vehicular display apparatus.

2. The vehicular display apparatus according to claim 1, wherein the decorative member is transparent acrylic member.

3. The vehicular display apparatus according to claim 1, wherein the decorative member is an annular ring member, and the annular ring member is arranged so as to provide a display superposed on an image of a scale projected by the liquid crystal display when visually recognized from the front side of vehicular display apparatus.

* * * * *